2,880,221
Patented Mar. 31, 1959

2,880,221

PRODUCTION OF TITANIUM ESTERS

John H. Haslam, Wilmington, Del., assignor to E. I. du Pont de Nemours and Company, Wilmington, Del., a corporation of Delaware No Drawing. Application August 7, 1953
Serial No. 373,039

12 Claims. (Cl. 260—429.5)

This invention refers to a new method of chemically modifying titanium esters and to a method for producing new and more useful titanium esters.

The formation of tetraalkyl titanates (also known as ortho esters of titanium), through direct reaction of the alcohols with titanium tetrachloride, in the presence of ammonia, is well known. Such a process is disclosed in U.S. Patent 2,187,821. The exchange of the organic radicals of titanium esters through alcoholysis is set forth in the literature. However, for the preparation of some esters neither of these methods is suitable.

This invention has among its objects the providing of a new process for chemically modifying a titanium ester, and as a further object the production of titanium esters and organic esters, different from the starting reactants. A still further object is a process of making new compositions of matter. Further objects will be revealed in the disclosure of my invention.

The objects of this invention are accomplished by metathetically interchanging at least one organic radical of the titanium ester by a different organic radical from the alcohol-derived portion of an organic ester, and forming a different titanium ester and a different organic ester. The titanium esters useful in this invention comprise orthoesters of titanic acid, e.g., butyl titanate and isopropyl titanate as well as condensed titanium esters which may be prepared from the orthoesters by reaction with water and subsequent condensation. Useful titanium esters include those represented by the formula $$RO[-Ti(OR)_2O-]_xR$$

wherein R is any hydrocarbon radical and $x$ is an integer. It is obvious that this formula represents the structure of the simple orthotitanates and the straight chain condensed esters. The orthotitanates or orthoesters are sometimes referred to as titanium alcoholates and phenolates.

More specifically, the objects of the invention are accomplished by bringing together and interacting a titanium ester and an organic ester, thereby metathetically replacing at least one organic radical of a titanium ester by a different organic radical from the alcohol-derived portion of the organic ester, forming a different titanium ester and a different organic ester, and separating the reaction products.

In a more specific embodiment of the invention, the objects are accomplished by metathetically replacing an organic radical of a titanium ester by reacting the titanium ester with an organic ester, the organic ester reactant containing at least one organic radical from the alcohol-derived portion of the ester, which is different from at least one of the organic radicals of the titanium ester reactant, forming a product titanium ester different from the reactant titanium ester and a co-product organic ester different from the reactant organic ester and separating the products as formed.

In another specific embodiment, the invention comprises the bringing together and reacting of about one mole part of an alkyl titanate, as for example tetraisopropyl titanate, with about four mole parts of an organic ester, as for example butyl acetate, in a reaction vessel equipped with a distillation head. The co-product, isopropyl acetate is removed from the reaction mixture by distillation at an elevated temperature leaving the reaction product, tetrabutyl titanate.

In a preferred embodiment the invention comprises bringing together a titanium ester of the formula $Ti(OR)_4$, R being an alkyl, aryl, aralkyl, or cycloalkyl radical of carbon atom content of at least 6, as for example tetraoctyl titanate, with an organic ester of a polyhydroxy alcohol in stoichiometric proportion as for example coconut oil, to form a stable intermediate solution, heating said solution to effect the ester interchange between the tetraoctyl titanate and the coconut oil, forming a solid, tough body of glycerol, monoglyceride and diglyceride titanates plasticized by the octyl esters of the coconut acids. The heat is conveniently applied by radiation, but also may be done by baking, or other suitable means. Temperatures within the range of 50° to 200° C. are suitable in effecting the metathetical reaction.

To a clearer understanding of the invention, the following specific examples are given. These examples are merely in illustration, but not in limitation of the invention.

Example I

Four hundred sixty-four parts by weight of n-butyl acetate were added with agitation to 284 parts of tetraisopropyl titanate in a reaction vessel. The reaction mixture was heated and the co-product isopropyl acetate was removed by fractional distillation, the temperature being raised to 90° C. The residual product was tetra-n-butyl titanate.

Example II

Two hundred thirty-two parts by weight of n-butyl acetate was added with agitation to 284 parts of tetraisopropyl titanate in a reaction vessel. The reaction was heated and the co-product isopropyl acetate was removed by fractional distillation, the temperature being raised to 90° C. The residual product was diisopropyl di-n-butyl titanate.

Example III

To 166 parts by weight of guaiacol acetate was added a solution of 142 parts by weight of tetraisopropyl titanate in 306 parts by weight of xylene, the mixture placed in a fractionating still and 101.5 parts by weight (equivalent to 99.5% theoretical) of isopropyl acetate boiling at 88° C. was removed. The xylene was separated from the still residue by vacuum distillation leaving the product diguaiacol diisopropyl titanate.

Example IV

Four mole parts by weight of phenyl benzoate and one mole part by weight of tetraisopropyl titanate were mixed in a vacuum distillation apparatus. During distillation, the theoretical amount (4 mole parts by weight) of isopropyl benzoate was removed at about 40 mm. pressure. The resulting orange-red crystalline product was tetraphenyl titanate.

Example V 33.8 parts by weight of coconut oil and 18.6 parts by weight of tetraoctyl titanate were commixed. This mixture was spread as a thin film on a glass slide and baked at 170° C., at which temperature the liquid film set up and became a solid clear plastic composition in the form of a film. Interaction took place during the baking to give a new durable plastic product, suggesting its use as a plastic film and as an ingredient in coating compositions.

Example VI

Thirty parts by weight of a commercially available Glyptal resin (General Electric 2502) were mixed with 5 parts by weight of tetrastearyl titanate dissolved in 24 parts by weight of xylene. The solution so obtained was flowed onto a glass slide to form a thin sheeted film and heated to approximately 120° C. under an infrared lamp. The resulting product was harder and more abrasion resistant than a film of the unmodified Glyptal resin similarly prepared. During the heat treatment reaction took place between the resin ester and the titanium ester. The heat also caused evaporation of the volatiles from the product.

Example VII

Thirty parts by weight of a commercial resin solution product sold under the trade name Syntex 120 (an epichlorohydrin-bis-phenol co-polymer completely esterified with soy acids) were mixed with three parts by weight of tetrastearyl titanate dissolved in 15 parts by weight of xylene. The solution obtained was spread onto a glass surface and heated as in the preceding example under an infra-red lamp to approximately 120° C. The resulting sheeted plastic product was more resistant to xylene than was the original Syntex 120 heated similarly. The above prepared solution of Syntex 120 and tetrastearyl titanate could be gelled by heating to approximately 70° C. showing metathetical reaction between the two esters at this temperature.

Titanium esters utilizable within the scope of the invention include tetra and mixed orthotitanates of the formula $Ti(OR)_4$, and condensed or polymeric alkyl and aryl titanates of the formula $RO[—Ti(OR)_2O—]_xR$, wherein R is at least one organic radical from the group comprising alkyl, aralkyl or cycloalkyl radicals or substituted alkyl, aryl, aralkyl, or cycloalkyl radicals and $x$ is an integer greater than one. Alkyl radicals of eight carbon chain length or less are preferred, in reactions where it is convenient to separate the reaction products by distillation. In reactions where it is preferable to allow the reaction products to remain together without separation, higher chain length, or the higher molecular weight alkyl or aryl groups are useful. The carboxylic ester reaction product in some applications can be usefully allowed to remain in coextensive relationship with the newly formed titanium ester as a modifier of the plastic product as shown in Example VII.

Specific titanium esters suitable for use in the process of the invention include tetraalkyl titanates such as tetraethyl titanate, tetra-n-propyl titanate, tetraisopropyl titanate, tetrastearyl titanate, and the like, tetraaryl titanates such as tetraphenyl titanate, and the like; mixed alkyl titanates such as dimethyl diisopropyl titanate, diethyl distearyl titanate, diisopropyl diphenyl titanate, diethyl dicyclohexyl titanate, and the like; polymeric or condensed alkyl or aryl titanates, such as polyisopropyl titanate, polyisoamyl titanate, and polyphenyl titanate, and the like; and substituted alkyl and aryl titanates, such as tetra-monochloroethyl titanate, tetra-dichlorphenyl titanate, and the like.

The organic esters contemplated as useful in this invention include any organic compound containing the ester linkage indicated by the structure,

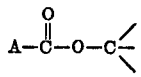

where A is hydrogen or the carbon atom, $\equiv C$, of an organic group. Thus, the simple esters of the type $R_3CCOOCR_3$ where R is hydrogen or a hydrocarbon radical as well as the poly-esters containing chains of ester linkages can be used, as can multiple esters, other than those usually referred to as polyesters, such as the esterification products of di, tri and polybasic acids with mono, di and poly-hydroxy alcohols, and the esterification products of di, tri and poly-hydroxy alcohols with mono-basic acids. The hydrocarbon radicals present in the esters may be alkyl, cycloalkyl, aryl, cycloaryl and of mixed hydrocarbon structure. Furthermore, the presence of compatible substituents such as ether groups, chloro-hydrocarbon radicals in the R groups is also a possible characteristic of the organic esters useful in this invention. Examples of these radicals are $CH_3—$, $C_3H_7—$, $CH_2=CHCH_2—$, $C_6H_5—$, $CH_3C_6H_4—$, $C_6H_{11}—$, $C_6H_5CH_2—$, $—CH_2—CH_2—$, $—C_6H_4—$, $C_6H_4Cl—$, $CH_3—O—C_6H_4—$, $—CH_2—$, $C\equiv$, etc. Since these radicals are to be substituted for those in the titanium esters the types suitable for one reactant find use in the other reactant. It is also possible to use organic esters of dibasic carboxylic acids as well as organic esters of polybasic alcohols. The selection of the organic ester for a particular operation will depend on the desired reaction product and separation of the co-products when the latter is to be effected.

Among the specific organic esters which may be used within the scope of the invention are included those formed by reaction of monohydric alcohols with monobasic carboxylic acids, of which n-butyl acetate, isobutyl acetate, isoamyl acetate, ethyl benzoate, and n-amyl stearate are examples; those formed by the reaction of polyhydric alcohols with monobasic carboxylic acids, of which glycerol triacetate, glycol diacetate, propylene glycol diacetate and glycerides as in naturally occuring oils and fats, are examples; those formed by the reaction of polyalcohols and polybasic carboxylic acids of which the glycerol-phthalic acid polyesters and ethylene glycol-phthalic acid polyesters are examples; those formed from monohydric alcohols and polybasic carboxylic acids, of which dimethyl sebacate and polymethylmethacrylate are examples, and fatty acid esters of co-polymers, an example of which is the soy acids ester of "Epon" resin, "Epon" resin being a copolymer of epichlorhydrin and p,p'-biphenol.

The metathetical replacement reaction of the invention may be illustrated by the following equations, wherein an alkyl titanate is reacted with an organic ester, said organic ester reactant having at least one organic radical derived from the alcohol portion of the organic ester which is different from at least one of the organic radicals of the titanium ester reactant.

(a)
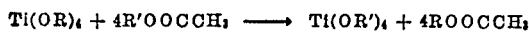

(b)
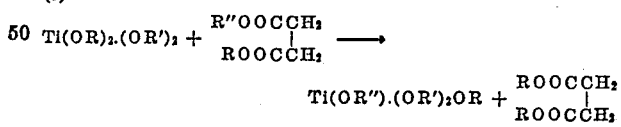

(c)
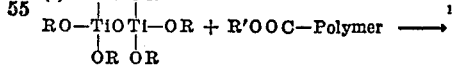

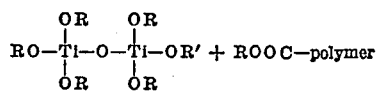

[1] Such as polymethacrylate.

A solvent for the reactants or reaction mixture is sometimes found to be advantageous. Usually, an anhydrous hydrocarbon solvent is preferred, but any inert anhydrous organic solvent may be used.

The reactions of this invention can take place under varying conditions but mild application of heat is generally desired as the metathesis is favored by rise in temperature. The liquid state for both ester reagents is also advantageous and this condition is realized in an undiluted system when the reactants are liquids, at normal temperatures. When one or both of the esters are solids, the liquid state may be reached by an elevation of temperature or by the use of solvents as disclosed above.

Temperatures of from 50° C. to 200° C. may be selected but a temperature within the range of 75° C. and 125° C. is considered as giving good results within a reasonable reaction time.

The production of new and useful titanium esters of known composition is possible by my process as it has been disclosed when using the esters having the hydrocarbon radicals enumerated above. There is no tendency to unduly complicated chemical reactions when the saturated aliphatic radicals as listed earlier in this specification are used in these metathetical reactions.

The advantages of the invention include not only an improved method for the preparation of titanium esters difficult to prepare by older methods, but also include an alternate method for the preparation of those carboxylic acid ester coproducts not easily or economically prepared by the usual methods of manufacturing such organic esters.

I claim as my invention:

1. A process for chemically modifying a titanium ester comprising reacting a titanium ester selected from the group comprising tetra and mixed orthotitanates of the formula $Ti(OR)_4$, and polymeric titanates of the formula $RO[-Ti(OR)_2O-]_xR$, wherein R represents hydrocarbon radicals selected from the group consisting of alkyl, aryl, aralkyl and cycloalkyl radicals, and $x$ is an integer greater than 1, with an organic ester containing at least one organic radical in the alcohol-derived portion of the ester which is different from at least one organic radical of the titanium ester, replacing at least one of the organic radicals of the titanium ester by a different organic radical from the alcohol-derived portion of the organic ester and forming a product titanium ester different from the reactant titanium ester and a coproduct organic ester different from the reactant organic ester.

2. A process for chemically modifying a titanium ester having the formula $RO[-Ti(OR)_2O-]_xR$ wherein R represents hydrocarbon radicals selected from the group consisting of alkyl, aryl, aralkyl and cycloalkyl radicals, and $x$ is an integer greater than one which comprises reacting said titanium ester with an organic ester containing at least one organic radical in the alcohol-derived portion of the ester which is different from at least one organic radical of the titanium ester and forming a product titanium ester different from the reactant titanium ester and a co-product organic ester different from the reactant organic ester.

3. A process for chemically modifying a titanium ester comprising reacting a titanium ester represented by the formula $RO[-Ti(OR)_2O-]_xR$ wherein R represents hydrocarbon radicals selected from the group consisting of alkyl, aryl, aralkyl and cycloalkyl radicals, containing at least 6 carbon atoms and $x$ is an integer with an organic ester which contains at least one alcohol-derived radical different from at least one hydrocarbon radical in the titanium ester replacing at least one of the organic radicals of the titanium ester by a different organic radical from the alcohol-derived portion of the organic ester and forming a product titanium ester different from the reactant titanium ester and a coproduct organic ester different from the reactant organic ester.

4. A process for chemically modifying a titanium ester comprising bringing together and interacting a titanium ester represented by the formula $Ti(OR)_4$ wherein R represents hydrocarbon radicals selected from the group consisting of alkyl, aryl, aralkyl and cycloalkyl radicals and an organic ester thereby metathetically replacing at least one organic radical of said titanium ester by a different organic radical from the alcohol-derived portion of said organic ester, forming a different titanium ester and a different organic ester, and separating the reaction products.

5. A process for chemically modifying a titanium ester, comprising reacting a titanium ester represented by the formula $Ti(OR)_4$ wherein R represents hydrocarbon radicals selected from the group consisting of alkyl, aryl, aralkl and cycloalkyl radicals with an organic ester, said organic ester reactant containing at least one alcohol-derived organic radical different from at least one of the organic groups of the titanium ester reactants, forming a product titanium ester different from the reactant titanium ester, and a co-product organic ester different from the reactant organic ester, separating the products as formed.

6. A process for the production of tetra-n-butyl titanate, comprising bringing together approximately stoichiometric quantities of n-butyl acetate and tetraisopropyl titanate, heating, and removing the co-product isopropyl acetate by distillation means.

7. A process for the production of diisopropyl di-n-butyl titanate which comprises reacting by mixing and heating approximately two moles of n-butyl acetate per mole of tetraisopropyl titanate, and removing the co-product isopropyl acetate by distillation means.

8. A process for the production of diguaiacol diisopropyl titanate metathetically which comprises bringing together approximately two moles of guaiacol acetate per mole of tetraisopropyl titanate in a distillation reaction vessel, heating and removing the by-product isopropyl acetate by distillation, and recovering the product.

9. A method of producing a new composition of matter which comprises mixing a titanium ester of the formula $Ti(OR)_4$, R being selected from the group consisting of alkyl, aryl, aralkyl, and cycloalkyl radicals, the carbon atom content of which is at least 6, with a carboxylic acid ester of a polyhydroxy organic compound.

10. A method of producing a new composition of matter which comprises mixing a titanium ester of formula $Ti(OR)_4$, R being selected from the group consisting of alkyl, aryl, aralkyl, and cycloalkyl radicals the carbon atom content of which is at least 6, with a carboxylic acid ester of a polyhydroxy organic compound, and heating said mixture to its gelation temperature.

11. A process of forming a titanium ester compound which comprises mixing coconut oil and tetraoctyl titanate and heating the mixture to its gelation temperature.

12. A process for chemically modifying a titanium ester comprising commingling a titanium ester selected from the group consisting of tetra and mixed orthotitanates of the formula $Ti(OR)_4$ and polymeric titanates of the formula $RO[-Ti(OR)_2O-]_xR$, wherein R represents hydrocarbon radicals selected from the group consisting of alkyl, aryl, alkaryl, and cycloalkyl radicals, and $x$ is an integer greater than 1, with an organic ester containing at least one organic radical in the alcohol-derived portion of the ester which is different from at least one organic radical of the titanium ester, said titanium ester being commingled in an amount sufficient to provide at least one TiOR unit per mol of organic ester, replacing at least one of the organic radicals of the titanium ester by a different organic radical from the alcohol-derived portion of the organic ester, and forming a product titanium ester different from the reacting titanium ester and a coproduct organic ester different from the reactant organic ester.

References Cited in the file of this patent

UNITED STATES PATENTS

| | | |
|---|---|---|
| 2,258,718 | Ruthrock | Oct. 14, 1941 |
| 2,620,318 | Boyd et al. | Dec. 2, 1952 |
| 2,680,723 | Kronstein | June 8, 1954 |

OTHER REFERENCES

Kraitzer et al.: Paint Notes, October 1947, p. 348–354.
Kraitzer et al.: Jour. Oil Colour Chem. Assoc., vol. 31 (1948), pp. 410–414.
"Angew: Chem." 64, 536 (1952).
Reeves et al.: J. A. C. S. 76, 2533 (1954).